United States Patent [19]

Pavda

[11] 4,041,291
[45] Aug. 9, 1977

[54] DOLLARS AND CENTS TELEPHONE METERING COMPUTER

[76] Inventor: Philip D. Pavda, 12 Prospect Ave., Voorhees, N.J. 08043

[21] Appl. No.: 646,769

[22] Filed: Dec. 19, 1975

[51] Int. Cl.² .............................................. G06F 15/20
[52] U.S. Cl. ................................ 235/156; 179/7.1 R; 235/92 TE
[58] Field of Search ................... 235/152, 156, 92 TE; 179/2 DP, 2 TC, 7 R, 7.1 R, 7.1 TP

[56] References Cited

U.S. PATENT DOCUMENTS

| | | | |
|---|---|---|---|
| 3,002,684 | 10/1961 | Luscher | 235/92 TE |
| 3,097,266 | 7/1963 | Luscher | 179/7 R |
| 3,164,677 | 1/1965 | Morris et al. | 235/92 TE |
| 3,769,463 | 10/1973 | Graham et al. | 179/7.1 TP |
| 3,865,994 | 2/1975 | Bender | 235/156 X |

Primary Examiner—Jerry Smith

[57] ABSTRACT

A battery powered hand held or telephone snap-on computer programmed digital calculator instrument, for simultaneously timing, computing and calculating cost plus tax of a running long distance telephone toll call (LDTTC) in dollars & cents ($ & ¢) and flashing same on a digital display readout screen. A caller feeds toll cost numbers into a calculator register via a numerically marked push-button key board...and sets a fixed charge selector switch to (1) or (2) minutes. At the start of a (LDTTC) caller presses a START BAR, actuating the computer programmed digital calculator circuits to perpetually flash ($ & ¢) of a running (LDTTC) on a digital display screen. At the end of said call, caller presses STOP BAR, again actuating the computer programmed digital calculator circuits to compute tax on final total simultaneously storing grand total into an accumulative digital storage register while flashing same on a digital display screen. Accumulative (LDTTC) totals can be retrieved and flashed on a digital display screen or erased anytime by pressing appropriately marked push buttons.

3 Claims, 6 Drawing Figures 4,041,291

DOLLARS AND CENTS TELEPHONE METERING COMPUTER

BRIEF SUMMARY

This invention relates to a small portable computer programmed digital calculator instrument which provides a simple means for the telephone utility consumer to perpetually monitor his long distance telephone toll call (LDTTC) visually in actual dollars & cents ($ & ¢) flashed on a lighted digital display screen once each minute during the running time period of a telephone call. Manual calculator (LDTTC) entries are simple. The dollar decimal point is automatically computed. Thereby, the consumer only presses corresponding numbered keys ignoring the decimal point when entering toll cost figures into the calculator register. The instrument operates completely independent of the telephone and is not dependent upon interconnections into the telephone line for its operation. Thereby, said instrument provides a ready and fast means for the telephone consumer (private or business) to gauge the length of a (LDTTC) according to personal fixed cost budgets or to a maximum ($ & ¢) limit per call per employee, as may be established by a particular Company employer.

BRIEF DESCRIPTION OF DRAWINGS

REFERRING TO FIG. 1

The instrument as illustrated in FIG. 1 and side view FIG. 1A, generally includes a calculator push button keyboard 87, for manually feeding fixed cost plus running cost numbers into the calculator registers. The computer PUSH BAR section comprises 84,85,86,99 for manually actuating the computer programmed logic circuits. Switch selector 98 manually sets a 1-minute or 2-minute fixed toll cost. Accumulative storage retrieve totals are flashed on the Screen 90 by pressing Button 92. Pressing Button 91 will erase said storage. Umbilical ribbon Cord 81A and 81B connects 83 to 80. Blinker 88 indicates that logic circuits are working. Switch 89 is an ON-OFF power switch. Fully automatic operation without interconnections into the telephone line can be realized with the telephone companies cooperation in agreeing to transmit coded information with each (LDIIC), which would be picked up by suction-cup induction Pickups 80F & 80C connected to decoding inputs 93,94,95,96,97,100. FIG. 1B, side view is an exact performance version of FIG. 1 and FIG. 1A and combines 83 & 80 into an integrated instrument without the umbilical cord 81.

BLOCK DIAGRAM FIG. 2

Pressing the CLEAR BAR down initializes the TOTAL + TAX programmer, plus the STOP/START CONTROL, plus the ELAPSED MINUTE TIMER, plus the CALCULATOR CHIP, to insure all guaranteed states. The sequence of events that occur upon activating the START BAR are: The ELAPSED MINUTE TIMER is enabled and the LED BLINKER is clocked on-off by the CLOCK OSCILLATOR. Also, the STOP/START CONTROL is alerted. When appropriate time has elapsed as selected by the 1-minute or 2-minute selector, it actuates the ELAPSED MINUTE TIMER logic and a GO signal is passed to the ($ & ¢) COUNT TIMER to activate the OPTO DRIVERS and subsequently the OPTO ISOLATORS and CALCULATOR CHIP to add the appropriate amount. The result is then passed to the DISPLAY DRIVERS, then to the LED DISPLAY SCREEN. When the STOP BAR is pressed down the STOP/START CONTROL and the TOTAL + TAX PROGRAMMER are notified. The TOTAL + TAX PROGRAMMER, pulsed by the CLOCK OSCILLATOR, sends the instruction to the OPTO DRIVERS and subsequently to the OPTO ISOLATORS and CALCULATOR CHIP (including memory) to add total plus tax and store results accumulatively. Simultaneously, the result is passed to the DISPLAY DRIVERS, then to the LED DISPLAY SCREEN. The CALCULATOR KEYBOARD is interfaced to the CALCULATOR CHIP for outside world entries. The memory portion of the calculator chip is erased or recalled by the STORAGE ERASE and STORAGE RETRIEVE switches respectively.

DETAILED DESCRIPTION OF DRAWINGS

Figures 1, 1A, 1B:
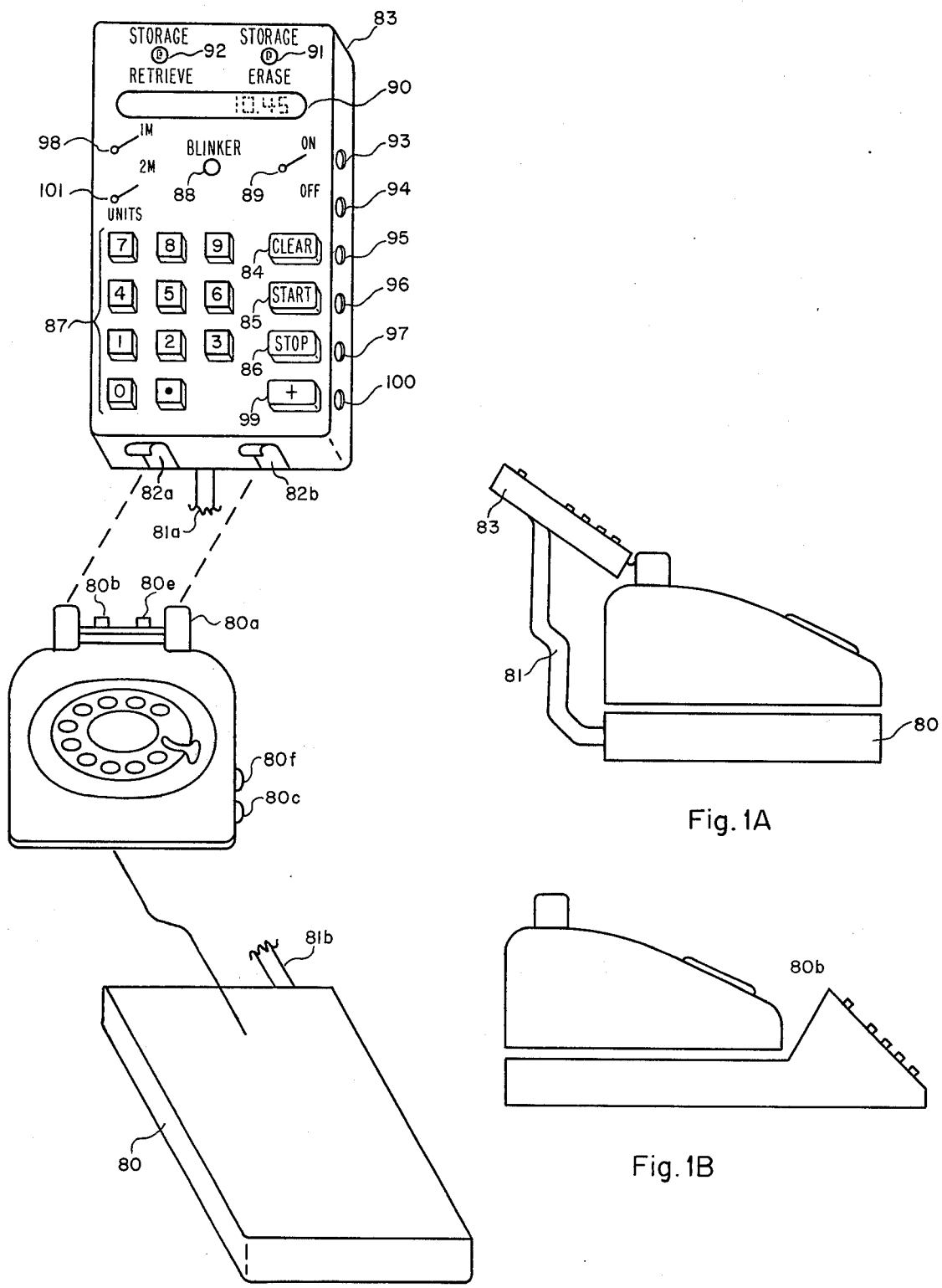
FIGS. 1, 1A and 1B are isometric drawings of the ($ & ¢) metering computer.
Figure 2:
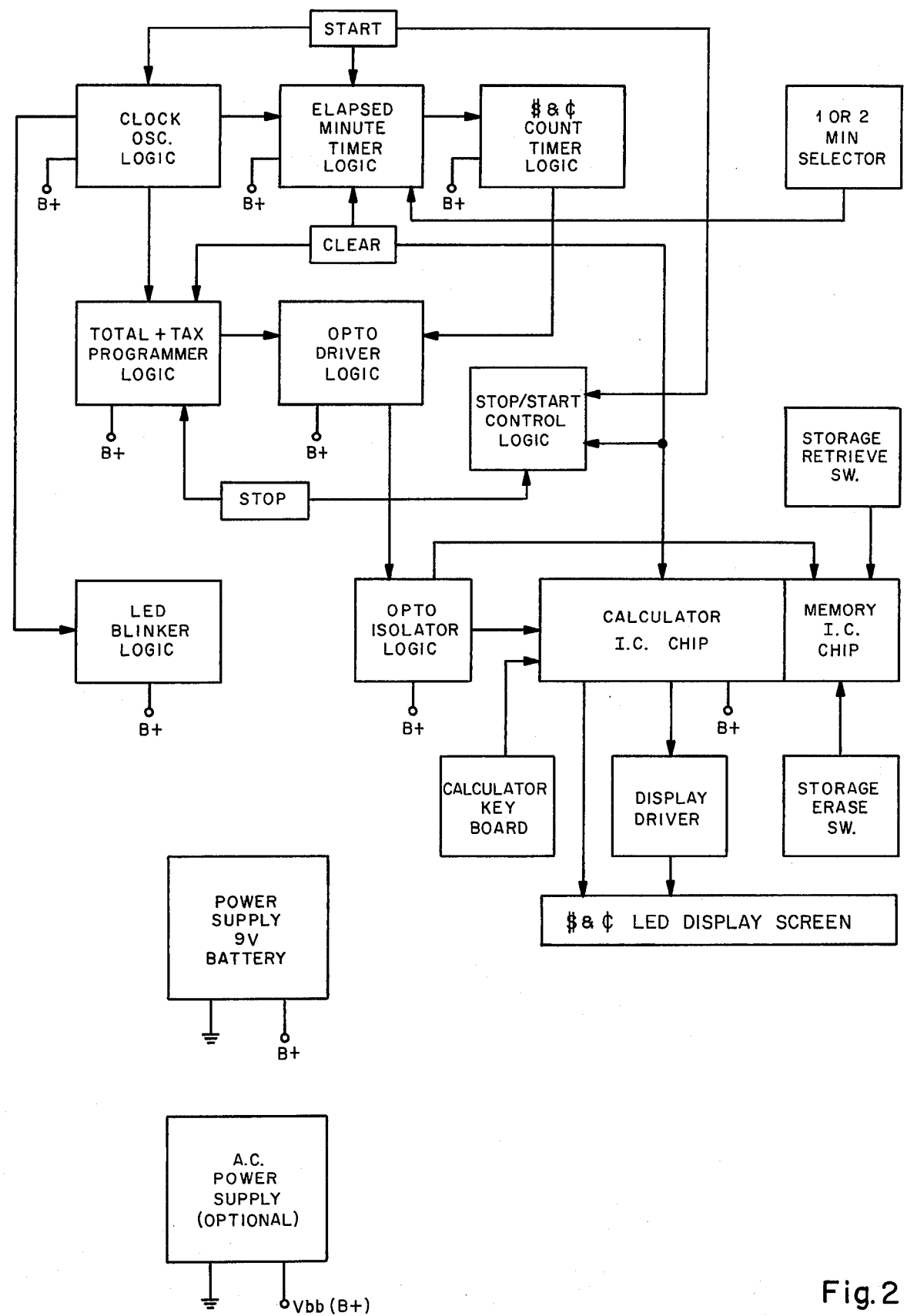
FIG. 2 illustrates a block-diagrammatic flow chart view of the logic circuits contained in the ($ & ¢) metering computer.

Referring to FIG. 1. Before dialing a long distance telephone toll call (LDTTC) number, the consumer simply obtains fixed and running cost figures for a particular toll number from the telephone operator, or refers to a prepared chart. He then enters respective cost figures into the calculator registers, via numbered push Button 87 and presses appropriately descriptive marked Push Bars 84,85,86, actuating the computer programming circuits at the start and end of the toll call conversation. Computed toll call totals plus tax for each call made, are automatically stored in the memory storage registers. Accumulative running totals can be retrived anytime by a key switch and/or Pushbutton 92. Storage memory can be erased anytime by a key switch and/or Pushbutton 91. The computer instrument runs on self-contained batteries, or can be operated from an external power supply plugged into Jack 100. The said instrument can be mounted on the phone hand-set bars via Clamps 82A & 82B. Computer programming circuits are mounted under the telephone base and interconnects to display and push button Unit 83 via Cable 81. It is noted here and pointed out that side view FIG. 1B is a self contained portable instrument where 80 is integrated with 83, eliminating the umbilical ribbon cord 81. The complete geometrical shape of the instrument can be easily visualized from side view FIG. 1B. Its portable adaptability can also be appreciated. For more elaborate industrial applications, fully automatic operations are possible by appropriate transducers plugged into respective Jacks 93,94,95,96,97 as described under automatic operation.

MANUAL OPERATION

REFERRING TO FIG. 1

1. The telephone consumer pushes Power Switch 89 to ON position.
2. Then pushes Selector Switch 98 to either (1-minute) or (2-minute) fixed toll rate.
3. CLEAR BAR 84 is pressed.

4. Consumer punches cost per fixed minute on Keyboard 87 and then punches (+) Bar 99. Next he punches cost per running minute again on Keyboard 87...ignoring the dollar ($) decimal point placement as it is automatically computed.

EXAMPLE: Cost per fixed minute = 1.32 Cost per running min. = 1.13

CONSUMER PUNCHES ON KEYBOARD 87: (1) (3) (2) [+] (1) (1) (3)

5. After telephone connection is made, the START BAR 85 is punched. The computer instrument will now compute cost of fixed time as selected by Switch 98 plus cost of each running minute thereafter, perpetually displaying ($ & ¢) totals on the lit digital display screen 90. Red blinker light 88 blinks during phone conversation indicating the logic circuits are functioning.

6. At end of conversation consumer punches STOP BAR 86. Computer programmed calculator circuits are actuated to calculate the tax on the total amount and displays grand total, including tax, on said Display Screen 90 and automatically stores same in a accumulative storage bank register. Accumulative storage totals can be retrieved anytime by a key switch and/or Push Button 92. Storage totals can be erased anytime by a key switch and/or Push Button 91.

FULLY AUTOMATIC OPERATION

Fully automatic operation of the telephone metering computer instrument could be attainable with no connections into the telephone line. It would require that the telephone Companies agree to transmit coded pulse information with each (LDTTC) dialed. Namely:

1. Fixed cost for 1st or 2nd minute.
2. Running cost per minute
3. Start
4. Stop It can be appreciated that by using standard state of the art circuitry compatible decoding logic circuits could be added to existing logic circuitry shown in FIG. 3 & FIG. 4. Additional compatible decoding logic circuits would automatically actuate the same single contact closure calculator entry Push Keys 87 and computer programmmed single contact closure Push Bars 84,85,86,99...as would be manually actuated by the consumer. The coded pulse information would be picked up by induction Tranducers 80F & 80C and feed via cable to respective decoding Jacks 93,94,95,96,97,100. It can be appreciated said jacks can be one multi-pin connector.

DETAILED DESCRIPTION OF THE LOGIC CIRCUITS

Figure 3:
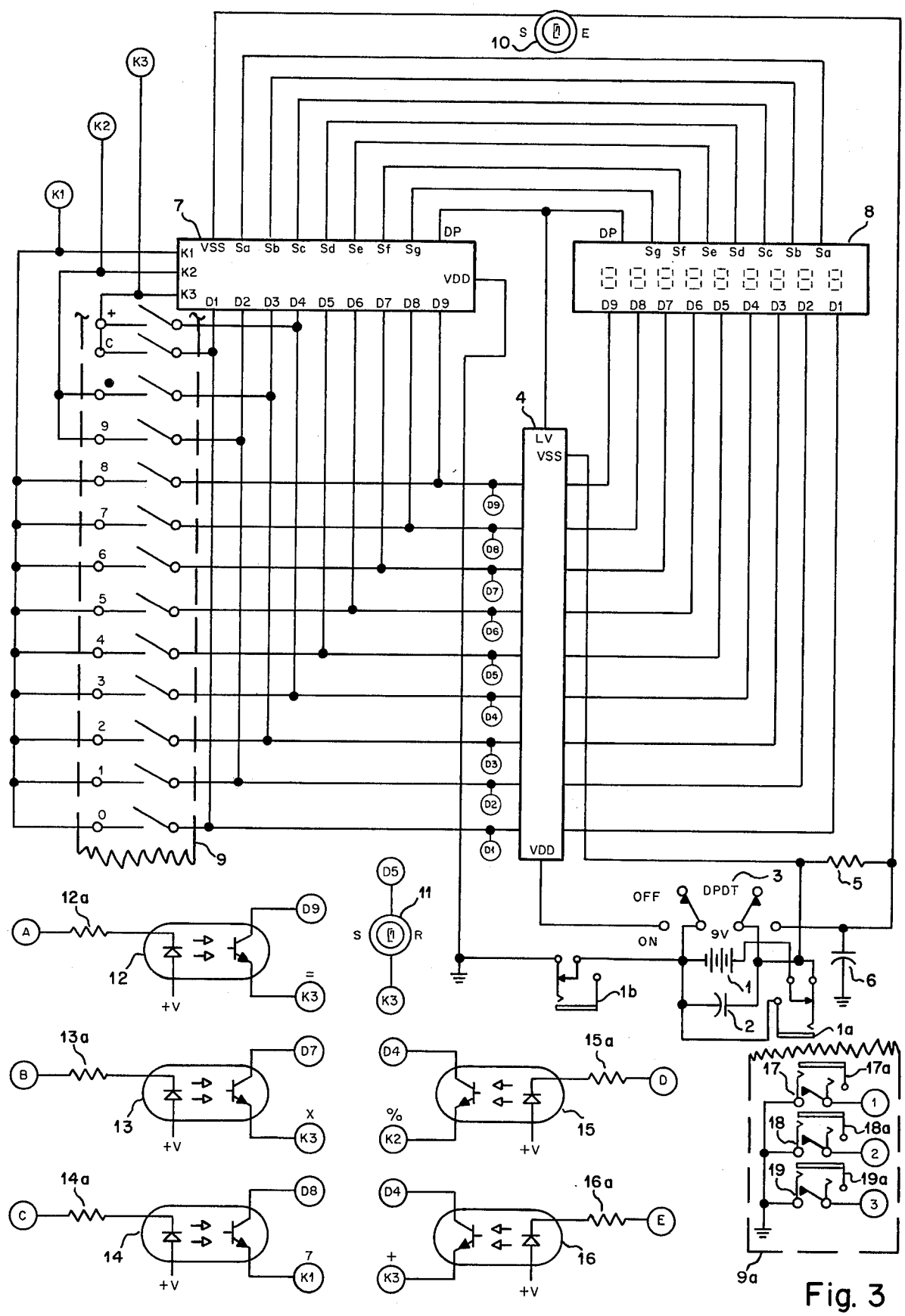
FIG. 3 is a schematic drawing of the opto isolators and calculator logic.
Figure 4:
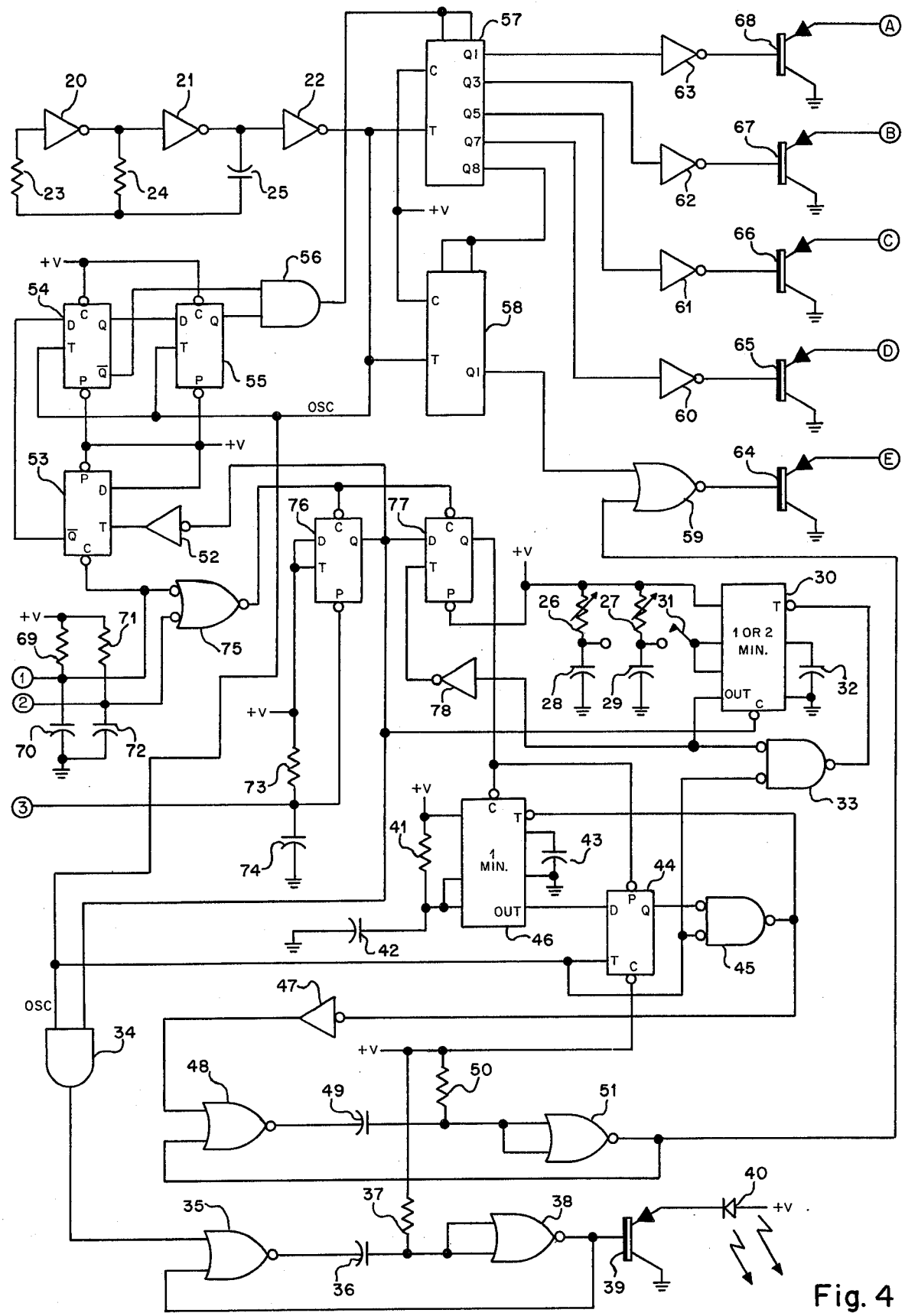
FIG. 4 is a schematic drawing of the programmer logic.

FIG. 3 is the opto isolator/calculator portion of the ($ & ¢) metering computer. The Battery Power Supply 1 or external power Supply 1A is turned on by Switch 3. Capacitors 2 and 6 are transient bypasses. (OFF) position of Switch 3 removes power (VDD) from display Driver 4, which drives the Display Screen 8, and switches in current Limiter Resistor 5 to Calculator Chip 7 for minimum current sufficient to retain memory storage. Entry to the Calculator Chip 7 by the operator is via the Keyboard 9. All other entries to the Calculator Chip 7 are via the Opto Isolators 12 thru 16 and are automatically taken care of by the programmer portion of the ($ & ¢) Metering Computer, FIG. 4. Resistors 12A thru 16A are current limiters for the opto isolators. Key Switch 10 removes all power to the Calculator Chip 7, which is used by the operator when he desires memory to be erased. Key Switch 11, when activated, acts as a key closure for memory retrieval and is used by the operator when he desires to view the contents of memory. Switch 17 is the clear bar key and is ganged with the clear key located on Keyboard 9. It is punched by the operator after switching power to (ON) to ensure guaranteed states of the programmer and calculator logic circuits. Switch 18 is the stop bar key which initiates the stop/start control logic and the total plus tax logic in the programmer (FIG. 4). Switch 19 is the start bar key which initiates the stop/start control logic and the elapsed minute timer logic in the programmer (FIG. 4). Remote Control Phone Jacks 17A thru 19A are used when the ($ & ¢) metering computer is in the automatic or semi-automatic mode. Circled (A) Thru (E) and 1, 2, and 3 connect to corresponding circled captions in FIG. 4. All other circled captions on FIG. 3 connect to corresponding points on FIG. 3.

REFERRING TO FIG. 4.

FIG. 4 is the programmer portion of the ($ & ¢) metering computer. When the Clear Bar Key 17 of FIG. 3 is punched, a logic low is generated at the junction of Pullup Resistor 69 and Transient Bypass Capacitor 70, resetting the Stop/Start Control Flip-flops 76 and 77 via OR GATE 75 and also resets the Total Plus Tax Control Flop 53. The Elapsed Minute Timer 30 and the ($ & ¢) Count Timer 46 are also guaranteed to be cleared via Flip-flops 76 and 77. The total plus tax PULSE FILTER Flip-flops 54 and 55 now store the correct polarity to ensure Shift Resistors 57 and 58 to hold logic (lows) on their outputs which are inverted by Gates 59 thru 63 placing a reverse bias on Opto Driver Transistors 64 thru 68...thereby, allowing the Opto Isolators 12 thru 16 of FIG. 3 to act as open switches on the Calculator Chip 7 of FIG. 3. When the Start Bar 19 of FIG. 3 is punched, a logic low is generated at the junction of Pullup Resistor 73 and Transient Capacitor 74, presetting Flip-flop 76 which lifts the clear on the Elasped Minute Timer 30. At the same time AND GATE 34 is allowed to pass the oscillator pulses generated from the oscillator circuit consisting of Resistors 23 and 24, Capacitor 25 and Inverter Gates 20, 21, and 22. These pulses are used by the Led Blinker Driver 39 to pulse and light Led 40 via the pulse shaper consisting of NOR GATES 35 and 38, and RC Network 36 and 37. The position already set on the minute selector Switch 31.

EXAMPLE: 2 MIN. 16 SEC...The first negative edge of the oscillator pulse will trigger the Elapsed Minute Timer 30 via Gate 33 into the 2 minute delay. Resistors 26 and 27 and Capacitors 28 and 29 being the correct RC network for the appropriate delays. The Programmer is in this state until (1) the Stop Bar 18 FIG. 3 is punched or (2) the Elapsed Minute Timer 30 is expired. In case (2), at the end of the two minute time period, Flip-flop 77 will be clocked via Inverter 78 and the clear on the ($ & ¢) Count Timer 46 and the preset on the ($ & ¢) Count Flip-flop 44 will be lifted. The steering of Flip-flop 44 allows Gate 45 to be primed and on the negative edge of oscillator pulse, Gate 45 will trigger the ($ & ¢) Count Timer 46 into the one minute delay period. Resistor 41 and Capacitor 42 are the correct RC networks for the appropriate delay. Gate 45 also pulses Gate 47, which inverts the signal and sends it into the pulse shaper consisting of NOR GATES 48 and 51 and the RC Network 49 and 50. This shaped pulse now feeds into NOR GATE 59 which inverts and turns (ON) Opto Driver Transistor 64. Current is allowed to flow thru Resistor 16A FIG. 3, which triggers the Opto Isolator 16 FIG. 3 to program running cost per minute into the Calculator Chip 7 via K3 and D4 of FIG. 3. This chain of events continues every minute, the ($ & ¢) count timer 46 being the controller, until the Stop Bar 18 FIG. 3 is punched indicating end of conversation. What remains to be completed by the programmer is to compute cost of the call including tax, displaying grand total on the LED screen display, and storing same into the accumulative memory register. This sequence of events is described below. In the case of the Stop Bar 18 FIG. 3 being punched the 2-minute elapsed period has been reached, no updating of the LED display screen as described above will occur. Only fixed cost plus tax, computed by the programmer, will be initiated. When the logic (low) signal at the junction of Pullup Resistor 71 and Transient Capacitor 72 is detected, the Stop/Start Control Flip-flops 76 and 77 are again cleared, as in the clear bar punched described above, ensuring all timers are reset. Simultaneously Total Plus Tax Control Flip-flop 53 is clocked by Inverter 52 and changes states, steering the total plus tax PULSE FILTER Flip-flop 54 (low), generating a single pulse thru (AND GATE) 56. This single pulse shifts down thru Registers 57 and 58 and inverted by Gates 59 thru 63 for the correct polarity to forward bias Opto Driver transistors 64 thru 68. Referring to FIG. 3, current now flows into Opto Isolators 12 thru 16, causing key closures, which instruct the Calculator Chip 7 to add 6% tax to total and to display grand total on the LED Display Screen 8, storing at the same time the same into the accumulative memory. The caller now has a visual readout in ($ & ¢) showing the cost of his call and the grand total stored in memory for future recall.

It should be understood that all specific components and parameters included in this specification are provided solely for purposes illustrating an operative embodiment and not as a limitation on the invention. It will be understood that changes in the precise embodiment of the invention herein disclosed may be made within the scope of what is claimed without departing from the spirit of the invention.

I claim:

1. An electronic solid state telephone toll call calculator of a size capable of being hand-held or affixed to a telephone by a snap-on arrangement, said calculator comprising:
    a display for displaying and noting the running telephone toll cost plus tax in dollars and cents;
    a keyboard having ten numerically marked pushbutton keys for entering the numerals 0–9 and four pushbar keys labeled "clear", "start", "stop" and "+";
    a calculator chip for computing the running cost of long distance telephone calls and connected to said display;
    a calculator memory for storing the values computed by the calculator chip; elapsed minute timer logic means responsive to actuation of the start key for measuring the duration of a long distance telephone call in minute intervals and generating a timing signal at the end of each interval;
    cost count logic means responsive to said timing signals for generating a cost signal representative of the cost for each interval measured by the elapsed minute timer logic means;
    opto-driver switching and isolator for calculator programing means responsive to said cost signals for enabling the calculator chip to add the cost represented by each cost signal to the running cost stored in the calculator memory;
    tax logic means responsive to actuation of the stop key for directing the calculator chip to compute the tax on the telephone call and add it to the running cost stored in the memory;
    means responsive to actuation of said clear key for clearing all circuits within the elapsed minute timer logic means, the calculator chip and the tax logic means;
    a blinker light for blinking on and off during telephone conversations to indicate that the calculator circuits are functioning;
    means for retrieving the running cost stored in said memory and displaying the same in response to actuation of a storage retrieve button or key switch on said keyboard; and means for erasing the value stored in said memory in response to actuation of a storage erase button or key switch located on said keyboard.

2. The electronic solid state telephone toll call calculator of claim 1 wherein said display includes means for automatically determining the placement of the decimal point when displaying dollars and cents values.

3. The electronic solid state telephone toll call calculator of claim 1 further comprising:
    a plurality of induction pickups attached to the the telephone externally also connected to the calculator and automatically responsive to coded information transmitted by the phone company for deriving information as to the start of the call, the fixed initial cost of the call, the running cost for each minute interval thereafter, and the termination of the call.

* * * * *